United States Patent
Hong et al.

(10) Patent No.: US 8,248,906 B2
(45) Date of Patent: Aug. 21, 2012

(54) FERROELECTRIC HARD DISK SYSTEM

(75) Inventors: Seung-bum Hong, Seongnam-si (KR); Sung-hoon Choa, Seoul (KR); Ju-hwan Jung, Seoul (KR); Hyoung-soo Ko, Seoul (KR); Yong Kwan Kim, Yongin-si (KR)

(73) Assignee: Seagate Technology International, LLC, Grand Cayman (KY)

( * ) Notice: Subject to any disclaimer, the term of this patent is extended or adjusted under 35 U.S.C. 154(b) by 1272 days.

(21) Appl. No.: 11/964,328

(22) Filed: Dec. 26, 2007

(65) Prior Publication Data

US 2008/0247085 A1    Oct. 9, 2008

(30) Foreign Application Priority Data

Apr. 6, 2007  (KR) ........................ 10-2007-0034413

(51) Int. Cl.
*G11B 9/00*       (2006.01)
(52) U.S. Cl. ..................... 369/126; 360/110
(58) Field of Classification Search ............ 369/126; 360/110
See application file for complete search history.

(56) References Cited

U.S. PATENT DOCUMENTS

| | | | |
|---|---|---|---|
| 5,777,977 A * | 7/1998 | Fujiwara et al. ............ 369/126 |
| 6,201,259 B1 * | 3/2001 | Sato et al. ...................... 257/30 |
| 6,238,934 B1 * | 5/2001 | Yang ................................ 438/3 |
| 6,477,132 B1 * | 11/2002 | Azuma et al. ................ 369/126 |
| 6,515,957 B1 * | 2/2003 | Newns et al. ................ 369/126 |
| 7,149,180 B2 * | 12/2006 | Onoe et al. ................... 369/276 |
| 7,283,453 B2 * | 10/2007 | Onoe et al. ................... 369/126 |
| 7,447,140 B2 * | 11/2008 | Lutwyche et al. ........... 369/126 |
| 2002/0018920 A1 * | 2/2002 | Yamamoto et al. ..... 428/694 TS |
| 2004/0004236 A1 * | 1/2004 | Fox et al. ...................... 257/295 |
| 2004/0004237 A1 * | 1/2004 | Fox ................................ 257/295 |
| 2004/0246879 A1 * | 12/2004 | Onoe et al. ................... 369/126 |
| 2005/0128675 A1 * | 6/2005 | Wang et al. .................. 361/271 |
| 2006/0023606 A1 * | 2/2006 | Lutwyche et al. ........... 369/100 |
| 2006/0261388 A1 * | 11/2006 | Shin et al. .................... 257/295 |
| 2007/0242594 A1 * | 10/2007 | Lantz et al. .................. 369/126 |
| 2007/0274193 A1 * | 11/2007 | Akiyama et al. ............. 369/126 |
| 2008/0068743 A1 * | 3/2008 | Kubo et al. ................ 360/77.08 |
| 2008/0187780 A1 * | 8/2008 | Jones et al. ................... 428/810 |
| 2009/0092032 A1 * | 4/2009 | Siegert et al. ................ 369/126 |
| 2009/0097385 A1 * | 4/2009 | Maeda et al. ................ 369/126 |
| 2009/0129247 A1 * | 5/2009 | Tran et al. .................... 369/126 |
| 2009/0161523 A1 * | 6/2009 | Tran et al. .................... 369/126 |
| 2011/0216642 A1 * | 9/2011 | Chou et al. ................... 369/126 |

FOREIGN PATENT DOCUMENTS

KR   10-2001-0045981 A   6/2001
KR   10-2001-0073306 A   8/2001

* cited by examiner

*Primary Examiner* — Thang Tran
*Assistant Examiner* — Brenda Bernardi

(57) ABSTRACT

A ferroelectric hard disk device is provided and includes: a ferroelectric media having a bottom electrode and a ferroelectric layer disposed on the bottom electrode; and a head formed above the ferroelectric media, the head being operative to write and reproduce information on the ferroelectric layer.

3 Claims, 5 Drawing Sheets

FERROELECTRIC HARD DISK SYSTEM

CROSS-REFERENCE TO RELATED PATENT APPLICATION

This application claims priority from Korean Patent Application No. 10-2007-0034413, filed on Apr. 6, 2007 in the Korean Intellectual Property Office, the disclosure of which is incorporated herein in its entirety by reference.

BACKGROUND OF THE INVENTION

1. Field of the Invention

Apparatuses consistent with the present invention relate to a ferroelectric hard disk device and, more particularly, to a ferroelectric hard disk device in which a hard disk media is formed to include a ferroelectric body to store and reproduce information using the switching principle of a ferroelectric dipole.

2. Description of the Related Art

With industrialization and the proliferation of information, the amount of information a person or an organization processes is increasing rapidly. Computers, which can be used to access the internet to get a wide range of information, and which have high data processing speeds and large data capacities are already widely used. In order to increase the data processing speed of the computers, CPU chips and computer peripheral appliances have been improved. Also, in order to improve data storage capacities, high densification for various kinds of information storage mediums, for example, hard disk drives, is being attempted.

A hard disk drive (HDD) device, one kind of information storage medium, usually includes a round-shaped disk type media with a magnetic layer on which a magnetic head for writing and reading information is formed. The magnetic head is installed in a suspension formed at an end of a swing arm, and is moved to desired track position on the media according to the operation of the swing arm to perform writing and reading operations. The magnetic head includes a reading head for outputting information stored in the media and a writing head for storing information. Recently, HDD devices have been developed as perpendicular magnetic recording types from horizontal magnetic recording types to increase the recording densities of information.

FIG. 1 is a cross-sectional view of a recording head and a recording medium of a typical HDD device. Referring to FIG. 1, the typical perpendicular magnetic recording device includes a recording medium 110, a recording head 120 recording data to the recording medium 110, and a reading head 130 for reading the data on the recording medium 110.

The recording medium 110 usually includes a substrate 111, a magnetic recording layer 112 on which information is recorded, and a protection layer 113. The recording head 120 includes a main pole P1, a return pole P2, and a coil C. The main pole P1 and the return pole P2 may be formed of a magnetic material such as nickel iron (NiFe), and here, the component ratio of each material should be different to obtain different coercivities for the main pole P1 and the return pole P2. The main pole P1 and the return pole P2 are used directly to record data to the magnetic recording layer 112 of the perpendicular magnetic recording medium 110. An auxiliary pole 121 is further formed at a side of the main pole P1 so that a magnetic field generated around the main pole P1 during data recording is gathered in a selected region of the perpendicular magnetic recording medium 110. The coil C surrounds the main pole P1 and generates a magnetic field. The reading head 130 includes first and second magnetic shield layers S1 and S2, and a magnetic resistance device 131 formed between the first and second magnetic shield layers S1 and S2. While reading data of a predetermined region of the selected track, the first and second magnetic shield layers S1 and S2 shield any other magnetic fields generated from magnetic elements around the region from arriving at the region being read. The data reading head 130 may be a magnetic resistance device such as a giant magneto resistance (GMR) structure or a tunnel magneto resistance (TMR) structure.

The magnetic resistance devices as described above use a perpendicular magnetic recording method to increase the information storage density; however, it is known that the recording density thereof of is 500-600 Gb/in$^2$ at most. Thus a further improved high density information storage device is required.

SUMMARY OF THE INVENTION

Exemplary embodiments of the present invention provide a ferroelectric hard disk device including a media recording layer formed of a ferroelectric body and a head capable of easily storing and reproducing information to a ferroelectric layer.

According to an aspect of the present invention, there is provided a ferroelectric hard disk device comprising: a ferroelectric media comprising a bottom electrode and a ferroelectric layer disposed on the bottom electrode; and a head disposed above the ferroelectric media, the head being operative to write and reproduce information on the ferroelectric layer.

The head may comprise: a substrate; an insulating layer disposed on the substrate; a reading head disposed on the insulating layer, the reading head including a source, drain, and channel region; a separation layer disposed on the reading head; and a writing head disposed on the separation layer.

The source and the drain may be disposed on opposite sides of the insulating layer, and the channel region is disposed between the source and the drain.

The writing head may comprise: a source and a drain disposed on opposite sides of the insulating layer; and a channel region disposed between the source and the drain.

BRIEF DESCRIPTION OF THE DRAWINGS

The above and other features and aspects of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1:
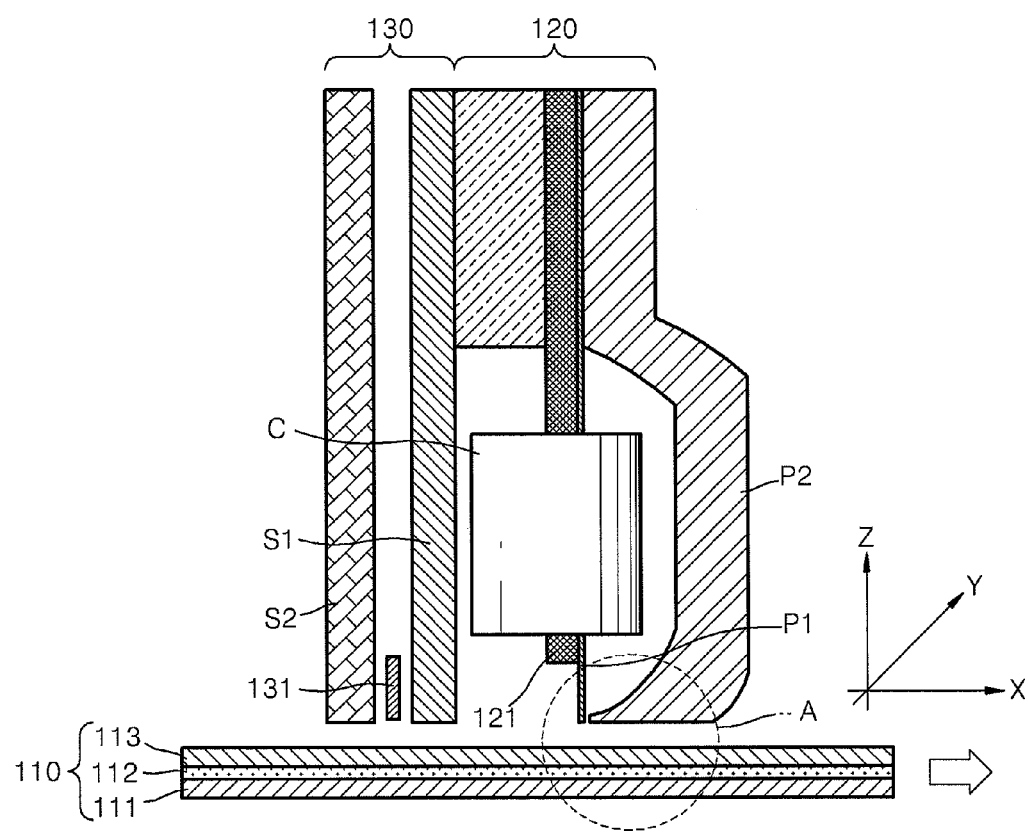
FIG. 1 illustrates a typical hard disk device according to the related art.

The present invention will now be described more fully with reference to the accompanying drawings, in which exemplary embodiments of the invention are shown. Here, the layers and the thicknesses of the region illustrated in the drawings are exaggerated for clarity of description.

Figure 2:
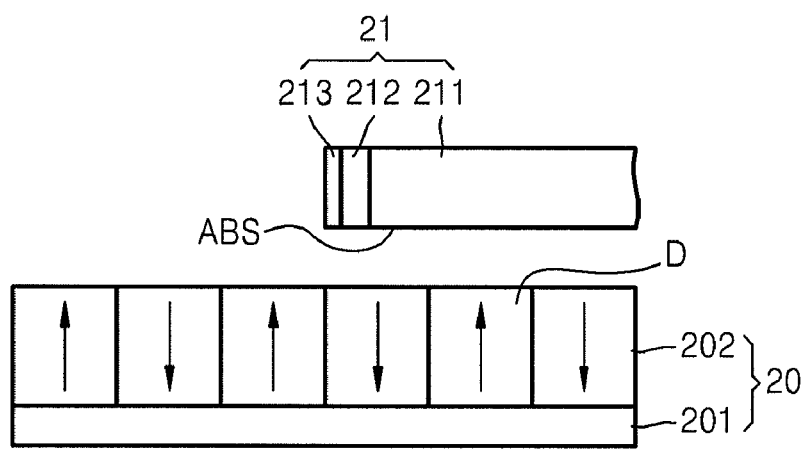
FIG. 2 illustrates a ferroelectric hard disk device according to an exemplary embodiment of the present invention.

FIG. 2 illustrates a ferroelectric hard disk device according to an exemplary embodiment of the present invention.

Referring to FIG. 2, the ferroelectric hard disk device according to the present invention includes a ferroelectric media 20 and a head 21 for writing or reading information stored in the ferroelectric media 20. The ferroelectric media 20 includes a ferroelectric layer 202 formed on a, for example, base or bottom electrode 201.

A ferroelectric material has a spontaneous polarization property and the polarization direction of a dipole of the ferroelectric material is reversed by an external electric field. In the ferroelectric hard disk drive consistent with the present invention, information is recorded such that a dipole of a domain D, which is an information unit of the ferroelectric layer 202 of the ferroelectric media 20, has an upward or downward polarization direction, and the information is read by detecting the polarization direction. The head 21 includes a reading head 212 and a writing head 213 that are formed on a side of an insulating layer 211.

Figure 3:
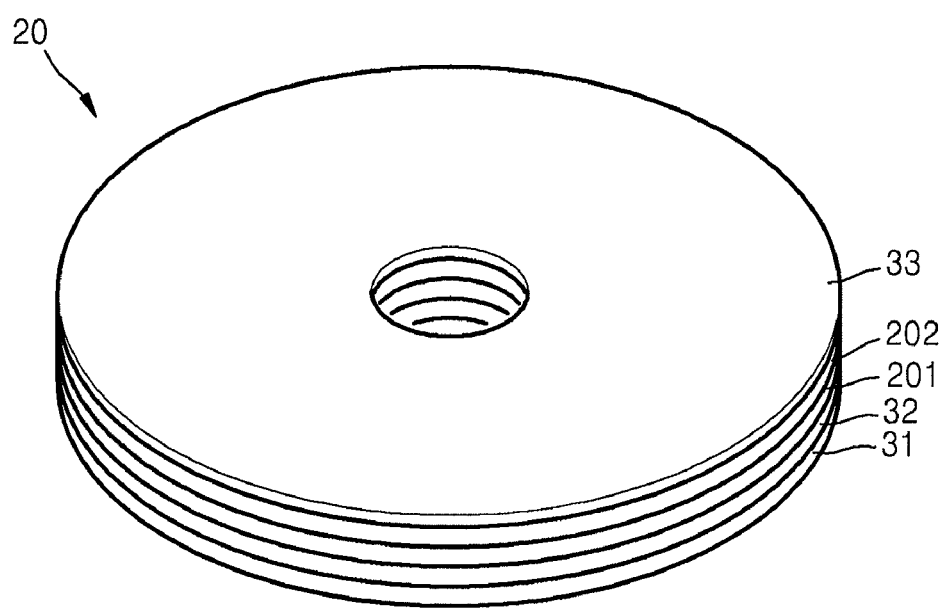
FIG. 3 is a perspective view of a media of a ferroelectric hard disk device according to an exemplary embodiment of the present invention.

FIG. 3 is a perspective view of a media of a ferroelectric hard disk device according to an exemplary embodiment of the present invention. Referring to FIG. 3, a media 20 includes a seed layer 32, a bottom electrode 201, and a ferroelectric layer 202 sequentially formed on a substrate 31. A protection layer 33 may be further formed on the ferroelectric layer 202.

The substrate 31 may be formed of, for example, Si, glass, etc. The bottom electrode 201 may be formed of an electrode material that is usually used for a typical semiconductor memory device, and may be formed of, for example, a metal such as Pt, Al, Au, Ag, Cu, etc. or a metal oxide such as $SrRuO_3$, $(La,Sr)CoO$, etc. The ferroelectric layer 202 may be formed of a ferroelectric material such as $PZT(PbZr_xTi_{1-x}O_3)$ (0<x<1), $PbTiO_3$, $PbZrO_3$, $PbTiO_3$, $SrBi_2Ta_2O_9$ (SBT), $KNbO_3$, $LiTaO_3$, $LiNbO_3$. The protection layer 33 may be formed by using diamond like carbon (DLC) and a lubricant that is usually used for a surface of a hard disk device together, or by using either one of the DLC and the lubricant.

Figure 7:
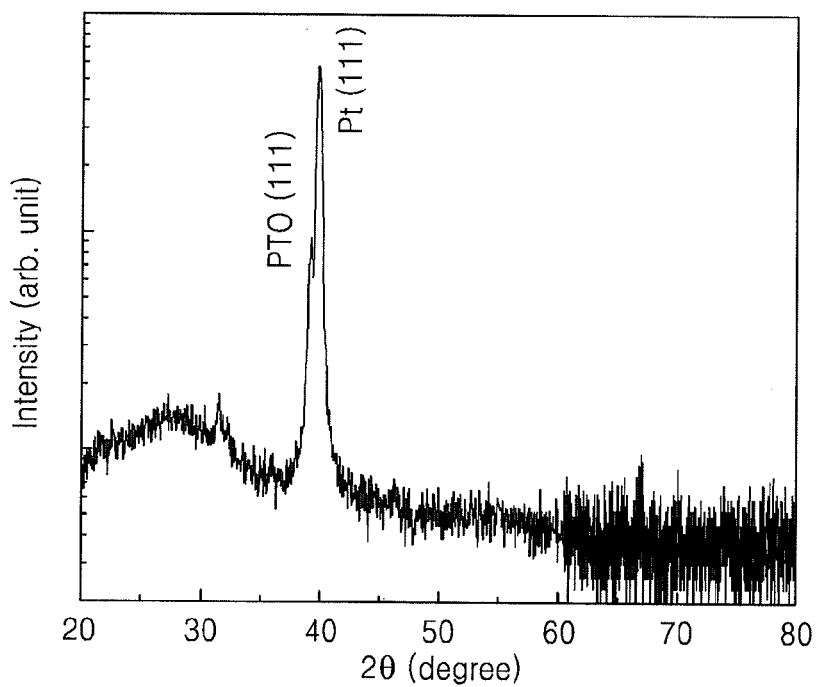
FIG. 7 is an XRD graph of a sample of the media formed as described with reference to FIG. 3.

A sample of the present invention was formed having a bottom electrode 201 using Pt formed to a thickness of about 20 nm on a glass substrate and a ferroelectric layer 202 using $PbTiO_3$ formed to a thickness of about 40 nm. FIG. 7 is an X-ray diffraction (XRD) graph of a slice of a sample of the media formed as described with reference to FIG. 3, and here, the domain, which is an information region unit formed on the ferroelectric layer, had a width of about 38 nm.

Figure 4:
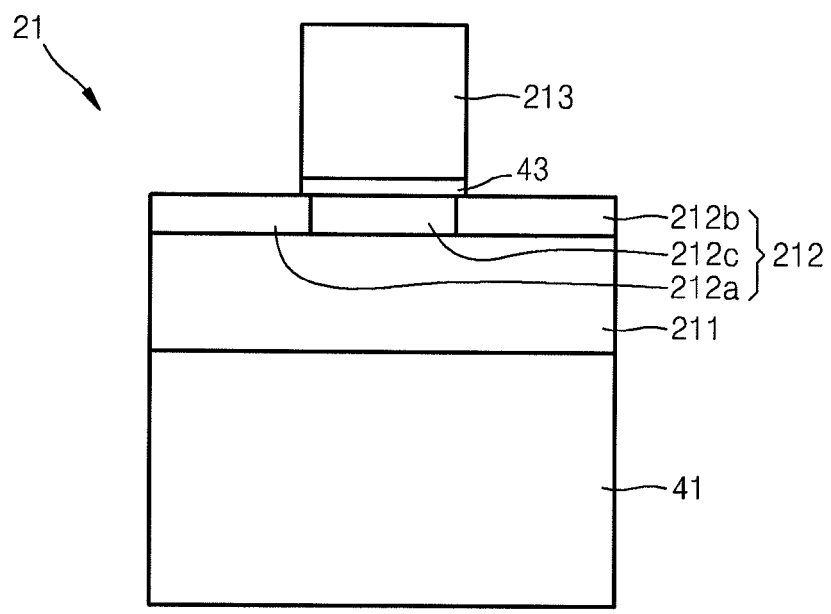
FIG. 4 illustrates an air bearing surface (ABS) of a head of the ferroelectric hard disk device according to the present invention.

FIG. 4 illustrates an air bearing surface (ABS) of a head of the ferroelectric hard disk device consistent with the present invention. Referring to FIG. 4, an insulating layer 211 is formed on a substrate 41, and a reading head 212 is formed on the insulating layer 211. The reading head 212 includes a source 212a and a drain 212b formed on either side of the insulating layer 211 and a channel region 212c formed between the source 212a and the drain 212b. A writing head 213 is formed on the reading head 212.

The substrate 41 may be, for example, an Si substrate that is usually used for a semiconductor device, and the insulating layer 211 may be formed of a material such as $SiO_2$. The source 212a and the drain 212b are formed of a material having a higher conductivity than the channel region 212c.

An example of a manufacturing method of the reading head 212 is as follows. A silicon on insulator (SOI) substrate including the insulating layer 211 in its middle portion is provided, and then As or P is doped to a density of about $10^{20}/cm^3$ on both sides of the channel region 212c to form the source 212a and the drain 212b, and to a density of about $10^{17}/cm^3$ on the channel region 212c to manufacture a reading head 212. An insulating material such as $SiO_2$ is coated on the reading head 212 to form a separation layer 43. The separation layer 43 is formed in order to separate the reading head 212 and the writing head 213 electrically. The writing head 213 is formed on the separation layer 43 to coat a conductive material such as metal. The writing head 213 may be formed of polysilicon, Al, Au, Ag, Pt, Cu, etc.

In FIG. 4, the width of the writing head 213 is illustrated to be similar to the width of the channel region 212c, but is not limited to this case and can be selected arbitrarily.

Hereinafter, the writing and reading principle of a ferroelectric hard disk drive according to an exemplary embodiment of the present invention will be described with reference to the drawings.

Figure 5A:
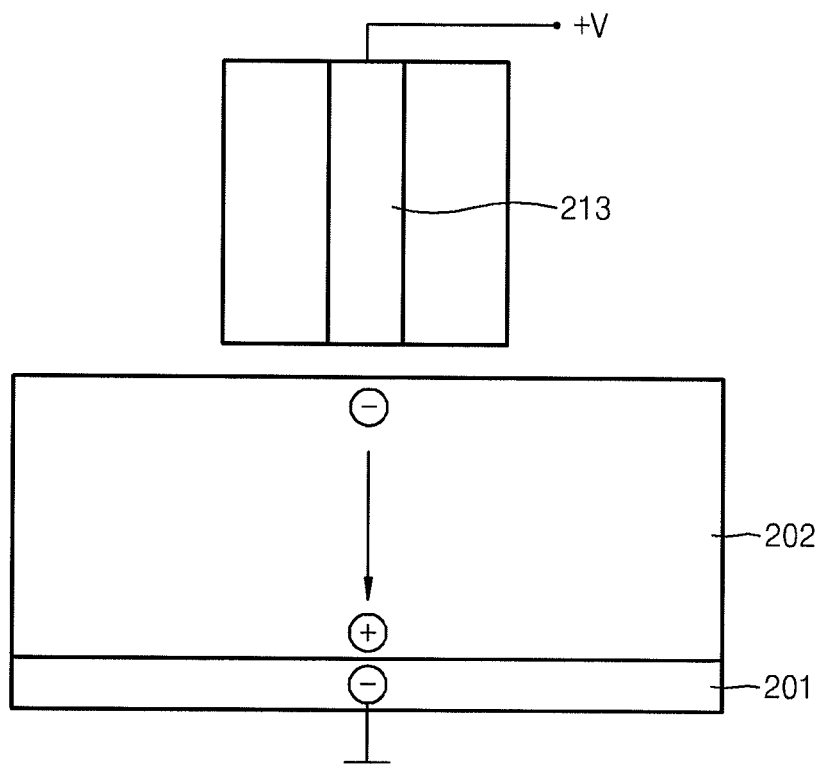
FIGS. 5A and 5B illustrate the information storage principle of the ferroelectric hard disk device according to the present invention.
Figure 5B:
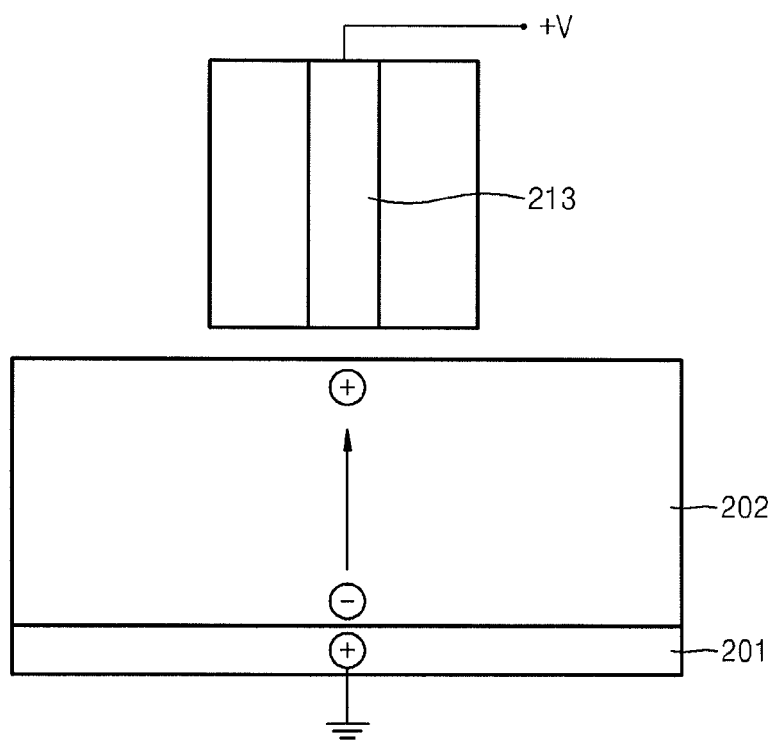

FIGS. 5A and 5B illustrate the information writing principle of a ferroelectric hard disk device according to an exemplary embodiment of the present invention. The information writing principle of a domain, which is an information region unit of a ferroelectric layer 202, by forming a dipole having a downward polarization direction will be described with reference to FIG. 5A. A negative potential is applied to the bottom electrode 201, and a positive potential is applied to the writing head 213. In this case, a dipole having a downward polarization direction is formed in the ferroelectric layer 202 of the writing head 213.

In order to form a dipole having an upward polarization direction, as illustrated in FIG. 5B, a positive potential is applied to the bottom electrode 201, and a negative potential is applied to the writing head 213. In this case, in the ferroelectric layer 202 below the writing head 213, a dipole having an upward polarization direction is formed.

Figure 6A:
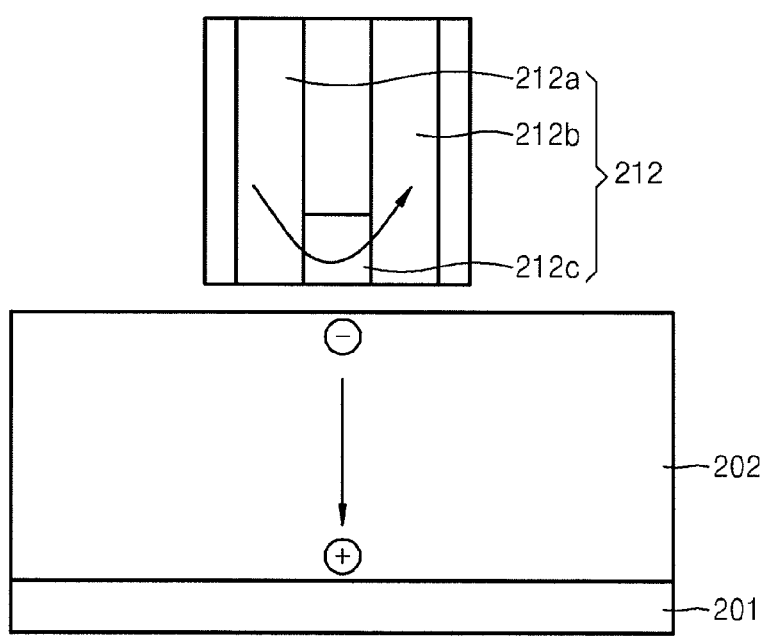
FIGS. 6A and 6B illustrate the information reproducing principle of the ferroelectric hard disk device according to the present invention.
Figure 6B:
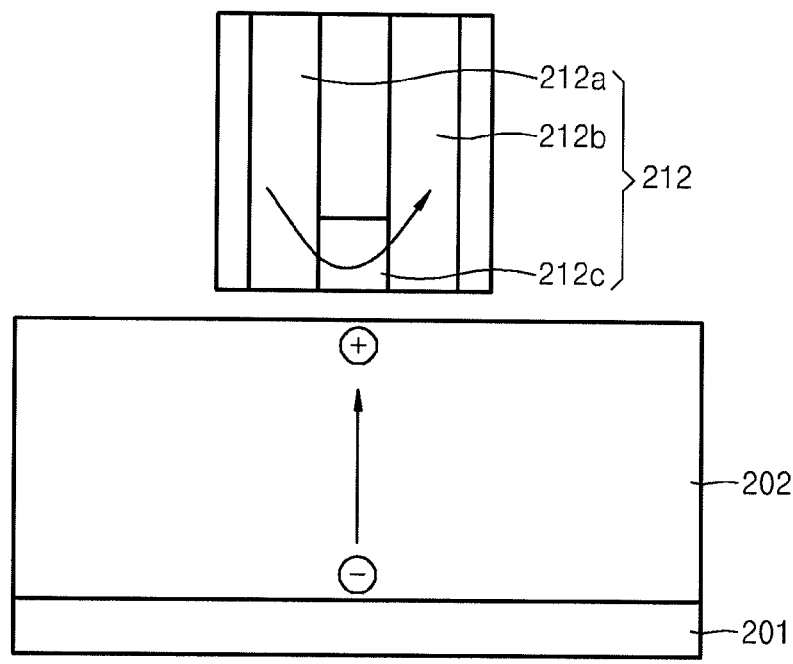

FIGS. 6A and 6B illustrate the information reading principle of a ferroelectric hard disk device according to an exemplary embodiment of the present invention. Referring to FIG. 6A, when a dipole having a downward polarization direction is formed in the ferroelectric layer 202 below the reading head 212, electron depletion is generated in the channel region 212c of the reading head 212 and thus a low current flows between the source 212a and the drain 212b.

On the other hand, as illustrated in FIG. 6B, when a dipole having an upward polarization direction is formed in the ferroelectric layer 202 below the reading head 212, electron accumulation occurs in the channel region 212c of the reading head 212 and thus a high current flows between the source 212a and the drain 212b. That is, the drain current Id flowing between the source 212a and the drain 212b of the reading head 212 varies greatly according to the polarization direction of the dipole included in the domain, which is the information region unit of the ferroelectric layer 202. Thus, information is read by detecting the polarization direction of the dipole of the ferroelectric layer 202 according to the difference in the current values.

According to the present invention, the information recording region of a media of a hard disk device is formed of a ferroelectric body, information is recorded by dividing a domain in the ferroelectric body into information region units and controlling the polarization direction of a dipole, and the information is read by detecting the polarization direction of the dipole. Since the size of the domain is minimized, the information storage density can be significantly increased compared to an HDD device using a conventional magnetic recording method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus comprising:
a ferroelectric medium comprising a bottom electrode and a ferroelectric layer disposed on the bottom electrode; and
a head disposed above the ferroelectric medium, the head being operative to write and reproduce information on the ferroelectric layer,
wherein the head comprises:
a substrate;
an insulating layer disposed on the substrate;
a reading head disposed on the insulating layer, the reading head including a source, a drain, and a channel region;
a separation layer disposed on the reading head; and
a writing head disposed on the separation layer.

2. The apparatus of claim 1, wherein the source and the drain are disposed on opposite sides of the insulating layer, and the channel region is disposed between the source and the drain.

3. An apparatus comprising:
a ferroelectric medium comprising a bottom electrode and a ferroelectric layer disposed on the bottom electrode; and
a head disposed above the ferroelectric medium, the head being operative to write and reproduce information on the ferroelectric layer,
wherein:
the head comprises a reading head including a source, a drain, and a channel region between the source and the drain;
the head is operative to reproduce information on the ferroelectric layer according to an amount of drain current flowing between the source and the drain;
when an information unit of the ferroelectric layer has a dipole with a downward polarization direction, electron depletion occurs in the channel region and a first drain current flows between the source and the drain; and
when an information unit of the ferroelectric layer has a dipole with an upward polarization direction, electron accumulation occurs in the channel region and a second drain current flows between the source and the drain, the second drain current being greater than the first drain current.

* * * * *